June 9, 1925.
H. B. JOHNSTON
TIRE
Original Filed Jan. 16, 1920
1,541,508
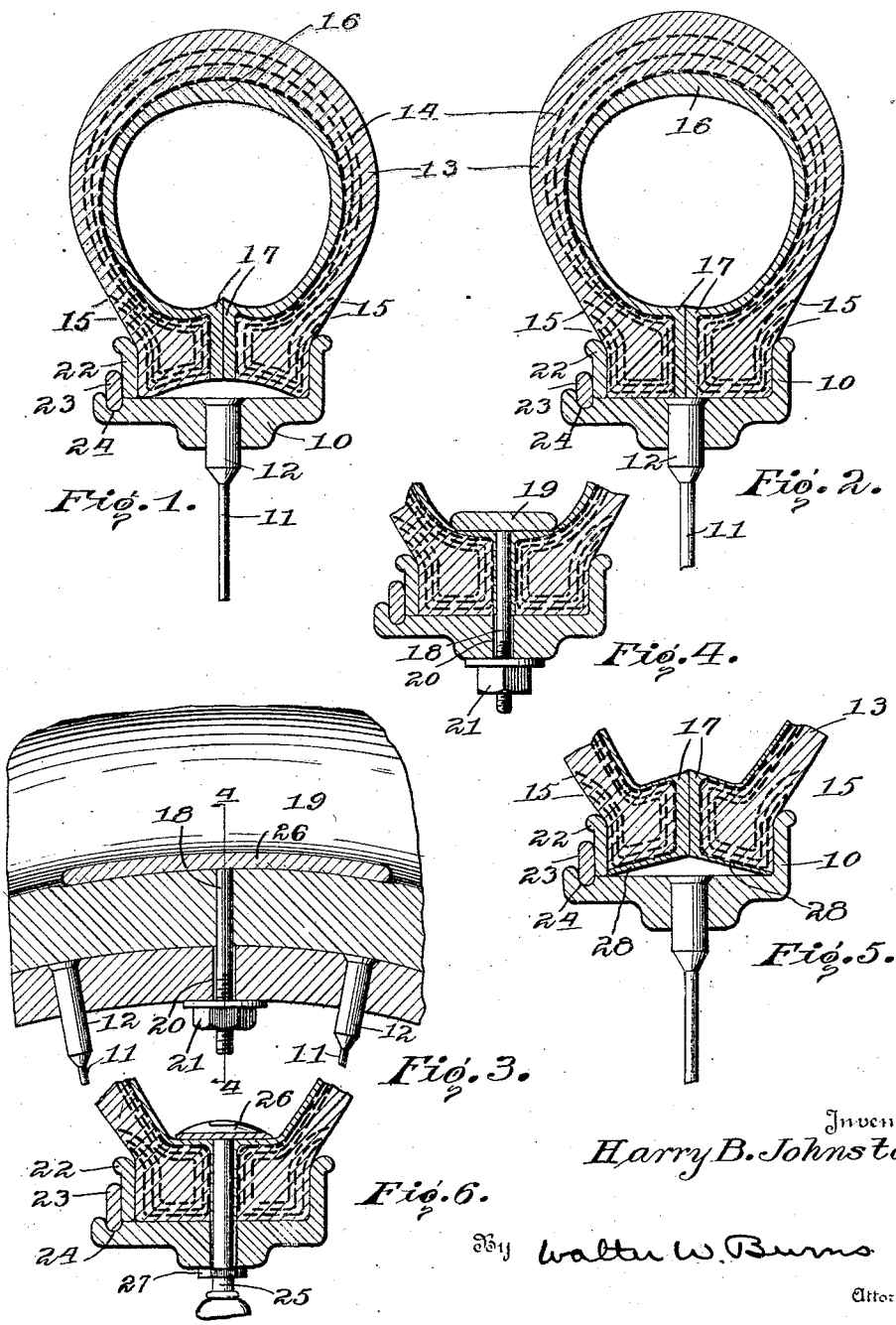
Inventor
Harry B. Johnston.
By Walter W. Burns
Attorney Patented June 9, 1925.

1,541,508

UNITED STATES PATENT OFFICE.

HARRY B. JOHNSTON, OF SEATTLE, WASHINGTON.

TIRE.

Application filed January 16, 1920, Serial No. 351,942. Renewed November 8, 1924.

*To all whom it may concern:*

Be it known that I, HARRY B. JOHNSTON, a citizen of the United States, residing at Seattle, in the county of King and State of Washington, have invented certain new and useful Improvements in Tires; of which the following is a specification.

This invention relates to pneumatic tires of the single tube type having a joint at the inner circumference thereof.

The principal object of my invention is the production of a practical simple single tube tire construction.

One of the objects of my invention is the provision of such a tire having a joint at its inner periphery and provided with a soft layer on each contacting surface of the joint.

Another object of the invention is the provision of such a tire having portions at the joint which are raised off of the rim when the tire is deflated but which are forced down upon the rim when the tire is inflated thus causing the joint to be made tighter.

Another object of this invention is the provision of such a single tube tire which has portions which form cushions to prevent the rim from cutting the tire when the same is deflated.

Another object is the provision in such a tire of clamping means for holding the tire on the rim of a wheel and thus prevent creeping of the tire on the rim.

Referring to the drawings:—

Figure 1 is a cross section of my tire showing the same in condition to be inflated.

Figure 2 is a cross section similar to Figure 1 showing the tire inflated.

Figure 3 shows a longitudinal fragmental cross section of the tire showing the clamping means.

Figure 4 is a cross section on the line 4—4 of Fig. 3.

Figure 5 is a cross section of a modification slightly different from the form shown in Figure 1.

Figure 6 is a cross section showing the method of attaching the valve to the tire.

The same reference characters refer to similar parts in the several views.

10 designates the rim of an automobile wheel, 11 the spokes thereof and secured thereto by the heads 12.

13 designates the outer or main body portion of the tire and in which is embedded the fabric reinforcements 14, three of which are shown in the present embodiment. It is to be understood that while three layers of fabric are shown this is merely illustrative and more or less may be used according to the type and weight of the tire. These layers of fabric 14 extend along the inside of the main body of the tire to the joint along the edge of the main body portion of the rim engaging portion and thence outwardly and along the rim flange where the layers terminate at different points as shown at 15.

Extending around the inner wall of the tire is a relatively soft rubber lining which is preferably thickened nearest the tread as shown at 16 and which extends throughout the length of the joint as shown at 17 and may extend along the rim contacting surface to the rim flange as shown at 28.

At intervals in the circumference of the tire may be placed clamping bolts 18 having heads 19. These clamping bolts pass through the tire at the joint at which places are provided opposed grooves on each side which together form the opening for the shank of the bolt. A hole 20 is provided in the rim to receive the bolt 18 and a nut 21 is provided to secure the bolt in place.

In placing the tire on the rim, the removable rim flange 22 and the locking ring 23 are removed. The tire is placed over the rim 10 and the removable flange 22 put in place. The locking ring is then placed in its groove 24. The tire is so constructed that when the parts are assembled, the soft rubber portion 17 will be in contact as shown in Figs. 1 and 5.

Prior to the placing of the outer side portion of the tire upon the ring, the bolts 18 if used are put in place and the tire arranged to have the registering groove in position to receive the shank. The parts of the tire are so proportioned that when in place, there will be a slight pressure between the two faces of soft rubber at the joint. As soon as the locking ring is in place, the nuts 21 are tightened on the bolts 18 and the head 19 drawn down against the inside of the tire.

The tire is now inflated. As the pressure increases on the inside of the rim engaging portions (see Figs. 1 and 5), these portions are pressed down to the shape shown in Fig. 2. The intense pressure compresses the soft layer between the hard portions of the rim engaging portions, thus effecting an excellent and air-tight joint.

The head 26 of the bolts 18 may be of any length or shape suitable to the use to which the tire is to be put.

In Fig. 6 is shown the valve stem 25 having a flange 26 thereon which lies in contact with the inner surface of the tire. The valve is held in place by the nut 27 and the construction of the tire at the point where the valve stem comes through is similar to the openings through which the bolts 18 pass and the valve stems are put in place at the same time as the bolts 18.

It is to be noted that the rim engaging portion of the tire is thicker than the height of the flange. This presents a distinct advantage since should the tire become deflated, the automobile could be run for some distance on the deflated tire without serious injury to the tire due to rim cutting.

It will thus be seen that I have produced a single tube tire structure which is simple and practical and which may be easily turned inside out to aid in making repairs.

It is also clear that in my invention the structure is securely held in place and since no friction between an inner tube and outer casing occurs, the common faults of the inner tube and outer casing construction, such as blowouts, torn tubes due to creeping, pinching and wrinkling, are obviated.

It is to be understood that many changes and modifications may be made in the detailed construction of my invention and that it is not intended to limit the construction except as set forth in the appended claims.

While preferred forms of valve, attaching means and clamping means are shown in the drawing and described in the specification, it is to be understood that any suitable valve attaching means and clamping means may be used or the clamping means may be omitted altogether.

Having described my invention, what I claim is:—

1. A single tube tire having a joint at its inner periphery and comprising relatively thick rim engaging portions, normally engaging the rim at the outside and inside of the rim respectively and coming together at substantially midway between the outside and inside of the rim to form the joint, the rim engaging portions adjacent the joint being normally out of contact with the rim when the tire is deflated.

2. A single tube tire having a joint at its inner periphery and comprising thickened portions adjacent the rim, the thickened portions normally engaging the rim at the sides thereof, the thickened portions coming together to form the joint and being normally out of contact with the rim at the joint when the tire is deflated.

3. A single tube tire having a joint at its inner periphery, relatively hard and soft portions in the rim engaging portions, the soft portions opposing each other, the rim engaging portion being so constructed as to contact with the rim at the joint when the tire is inflated and to be out of contact when the tire is deflated, bolts passing through the tire at the joint for securing the tire in place.

4. A single tube tire having a joint at its inner periphery, rim engaging portions forming a joint at their abutting sides and each having a cross section substantially the shape of a nonrectangular parallelogram when the tire is deflated and of a substantially rectangular cross section when the tire is inflated.

5. A single tube tire having a joint at its inner periphery and comprising rim engaging portions abutting to form the joint, reinforcing fabrics for said tire following closely the shape of the wall of the chamber and turning to conform to the joint and being turned outwardly parallel to the axis of the tire and being folded back toward the outside of the tire to a point beyond the rim engaging surface, said rim engaging portions being in contact with the rim near the outside of the rim and being normally out of contact with the rim adjacent the joint, when the tire is deflated.

In testimony whereof I affix my signature.

HARRY B. JOHNSTON.